United States Patent
Jung

(12) 
(10) Patent No.: US 6,456,341 B1
(45) Date of Patent: Sep. 24, 2002

(54) CRT ASSEMBLY OF PROJECTION TV SYSTEM

(75) Inventor: Sung-su Jung, Kyungki-do (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/533,965

(22) Filed: Mar. 23, 2000

(30) Foreign Application Priority Data

Mar. 31, 1999 (KR) .............................................. 99-11304

(51) Int. Cl.⁷ ................................................. H04N 5/74
(52) U.S. Cl. ........................ 348/776; 348/749; 348/748
(58) Field of Search ................................ 348/748, 749, 348/776; 313/35, 36, 478; H04N 5/74

(56) References Cited

U.S. PATENT DOCUMENTS

| | | | | |
|---|---|---|---|---|
| 4,717,853 A | * | 1/1988 | Ezawa et al. .................. | 313/35 |
| 4,740,727 A | * | 4/1988 | Inaida et al. ................... | 313/36 |
| 4,777,532 A | * | 10/1988 | Hasegawa ..................... | 348/749 |
| 4,780,640 A | * | 10/1988 | Hasegawa ..................... | 313/36 |
| 4,982,289 A | * | 1/1991 | Mitani et al. ................ | 358/237 |
| 5,373,394 A | * | 12/1994 | Oh ................................ | 359/634 |
| 5,537,167 A | * | 7/1996 | Toide et al. .................. | 353/100 |
| 5,877,583 A | * | 3/1999 | Meglio et al. ................. | 313/35 |
| 6,130,497 A | * | 10/2000 | Takezawa et al. ............. | 313/35 |
| 6,188,165 B1 | * | 2/2001 | Lee .............................. | 313/44 |
| 6,384,874 B1 | * | 5/2002 | Ushizaka ..................... | 348/749 |

FOREIGN PATENT DOCUMENTS

JP 294174 * 10/2000

* cited by examiner

Primary Examiner—John Miller
Assistant Examiner—Brian Yenke
(74) Attorney, Agent, or Firm—Robert E. Bushnell, Esq.

(57) ABSTRACT

A CRT assembly of a projection TV system includes a CRT for forming an image, a projection lens for magnifying and projecting the image formed by the CRT, a coupler installed between the CRT and the projection lens, a coolant receiving portion formed at the center of the coupler, having a front surface in contact with the projection lens forming a seal and a rear surface in contact with a front surface of the CRT forming a seal, a coolant injection hole formed to penetrate the side of the coolant receiving portion, through which coolant is filled in the coolant receiving portion, and a pressure control device for controlling the pressure of coolant in the coolant receiving portion while sealing the coolant injection hole.

10 Claims, 6 Drawing Sheets

FIG. 2 *(Prior Art)*

CRT ASSEMBLY OF PROJECTION TV SYSTEM

CLAIM OF PRIORITY

This application makes reference to, incorporates the same herein, and claims all rights accruing thereto under 35 U.S.C. §119 through my patent application entitled APPARATUS FOR COOLING OF PROJECTION TV earlier filed in the Korean Industrial Property Office on the day of Mar. 31, 1999 and there duly assigned Serial No. 1999/11304.

FIELD OF THE INVENTION

The present invention relates to a cathode ray tube (CRT) assembly of a projection TV system, and more particularly, to a CRT assembly of a projection TV system All too often, in a CRT assembly for a TV projection system, a coupler which holds the coolant requires an oil cap and an oil cap holder for controlling the pressure of the coolant in the coupler in addition to a separate coolant injection hole for filling the coupler with coolant. Such an arrangement requires two seals and two separate entities for operation of the coupler which is costly, cumbersome, and difficult to manufacture. What is needed is a coupler which holds coolant and is connected to the CRT assembly that uses a single coolant injection hole for both filling the coupler with coolant and for controlling the pressure of the coolant in the coupler.

DESCRIPTION OF THE RELATED ART

Referring to FIG. 1, a typical projection TV system is for projecting an image formed by a CRT assembly A installed inside a main body 1 to a rear surface of a screen 3 installed in the front side of the main body 1 by reflecting the image by a reflection mirror 2. FIGS. 2 and 3 are a sectional view and an exploded perspective view of a conventional CRT assembly, respectively. Referring to the drawings, the conventional CRT assembly includes a CRT 10 for forming an image, a coupler 20 coupled to the front surface of the CRT 10, and a projection lens 30 for magnifying and projecting the image formed at the CRT 10.

The CRT 10 and the projection lens 30 are coupled to the coupler 20 through sealing members 11 and 31 and fixing brackets 12 and 32. A coolant receiving portion 21 and a coolant injection hole 22 are formed at the coupler 20. The coolant receiving portion 21 is formed at the center of the coupler 20 and contains coolant C in inner space sealed by the CRT 10 and the projection lens 30. The coolant injection hole 22 is for injecting coolant C into the sealed space and is sealed by a bolt 23 coupled to the coolant injection hole 22 and a sealing member 24 to prevent leakage of coolant C. Also, the conventional CRT assembly includes a hole 25, an oil cap 26 and an oil cap holder 27 as a pressure control device, for controlling the pressure of coolant C contained in the coolant receiving portion 21 when the temperature of the CRT 10 increases.

The hole 25 is formed at one surface of the coupler 20 to penetrate the inside and outside of the coolant receiving portion 21. The oil cap 26 is dome shaped so that a part thereof can be inserted into the inside of the coolant receiving portion 21. The oil cap 26 is formed of a soft material such that, when the inserted part of the oil cap 26 contacts coolant C and the pressure of the coolant C increases, a convex portion of the oil cap 26 can be deformed to be concave and thus the pressure of coolant C can be absorbed in a direction in which the inner space of the coolant receiving portion 21 increases. The oil cap holder 27 is for fixing the oil cap 26 to the coupler 20 to prevent coolant C from leaking between the oil cap 26 and the hole 25.

However, in the conventional CRT assembly of a projection TV system, the coolant injection hole 22, the bolt 23 and the sealing member 24 are needed at the coupler 20 for injecting coolant C and the hole 25, the oil cap 26 and the oil cap holder 27 are needed for controlling the pressure of coolant C. Thus, as the structures for injecting coolant and for controlling the pressure of coolant are respectively needed, the number of parts increases and the assembly work becomes complicated. Also, in a state in which the oil cap 26 and the oil cap holder 27 are installed at the CRT assembly, the oil cap 26 continues to contact coolant C. Accordingly, when the pressure of coolant C increases excessively due to the heat of the CRT 10, the oil cap 26 is destroyed by the excessive pressure of coolant C and the coolant C leaks from the coupler 20.

SUMMARY OF THE INVENTION

To solve the above problems, it is an objective of the present invention to provide a CRT assembly of a projection TV system in which the structure for injecting coolant into the coolant receiving portion of the coupler and controlling the pressure of the coolant is improved.

It is also an object to provide a CRT cooling system that uses a single coolant injection hole to both fill the cooling system with coolant and to control the pressure of the coolant in the cooling system, thus avoiding the need for separate ports for filling the cooling system with coolant and controlling the pressure of the cooling system.

It is also an object to provide a coupler containing coolant for a CRT in a TV projection system that is easy to manufacture and requires fewer parts. Accordingly, to achieve the above objects there is provided a CRT assembly of a projection TV system which comprises a CRT for forming an image, a projection lens for magnifying and projecting the image formed by the CRT, a coupler installed between the CRT and the projection lens, a coolant receiving portion formed at the center of the coupler, having a front surface in contact with the projection lens forming a seal and a rear surface in contact with a front surface of the CRT forming a seal, a coolant injection hole formed to penetrate the side of the coolant receiving portion, through which coolant is filled in the coolant receiving portion, and a pressure control device for controlling the pressure of coolant in the coolant receiving portion while sealing the coolant injection hole.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
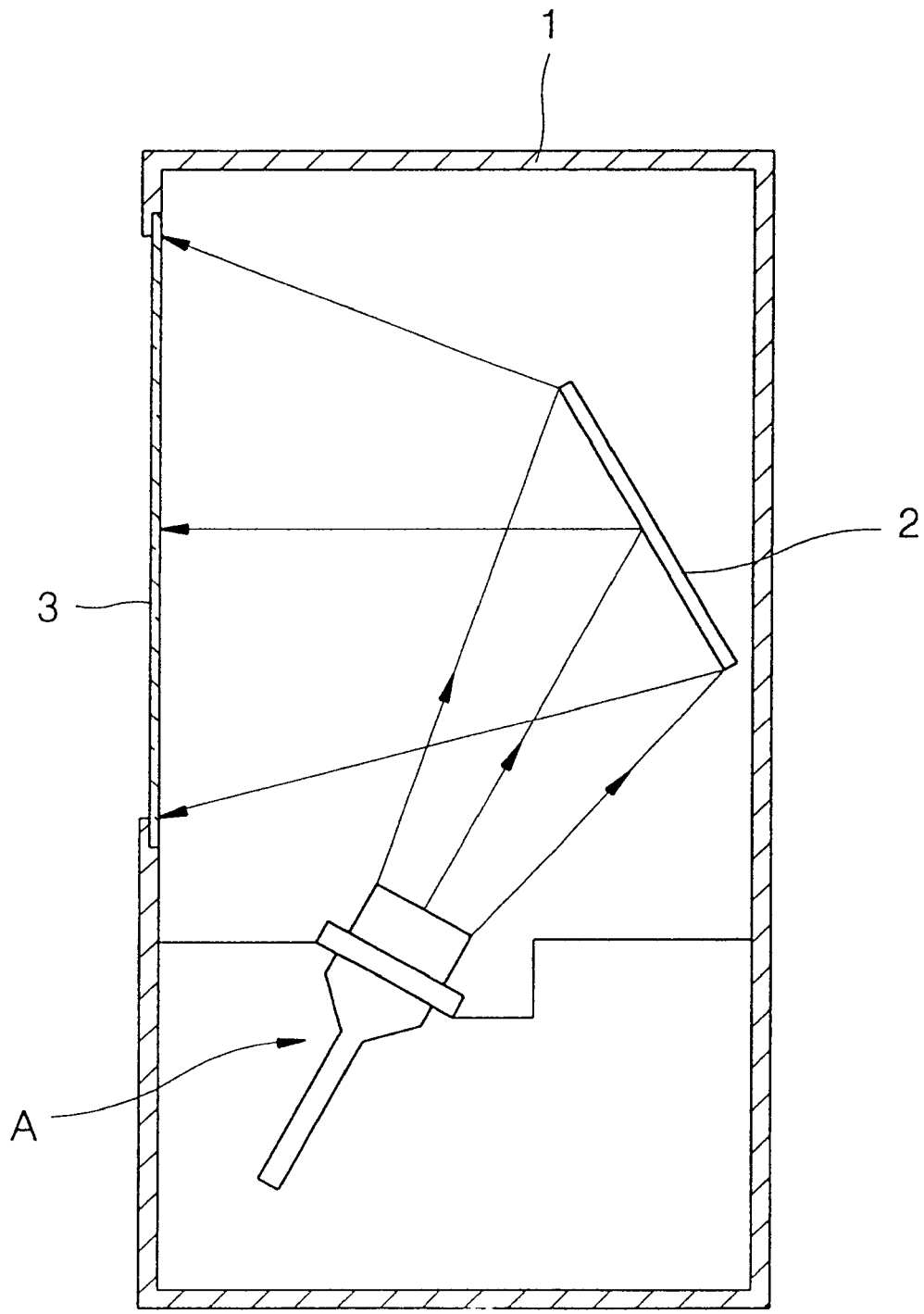
FIG. 1 is a sectional view showing a typical projection TV system.
Figure 2:
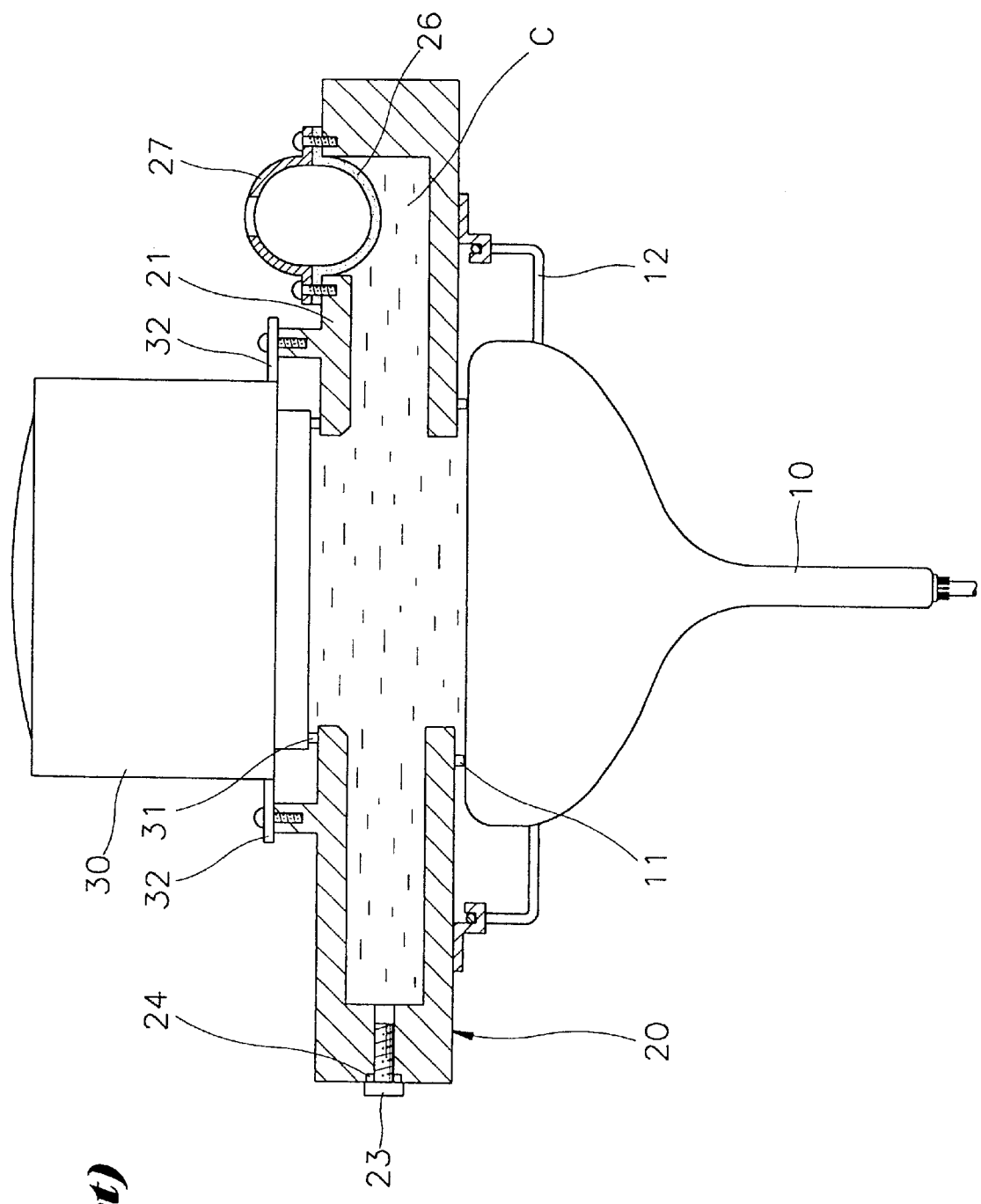
FIG. 2 is a sectional view showing a CRT assembly of a conventional projection TV system.
Figure 3:
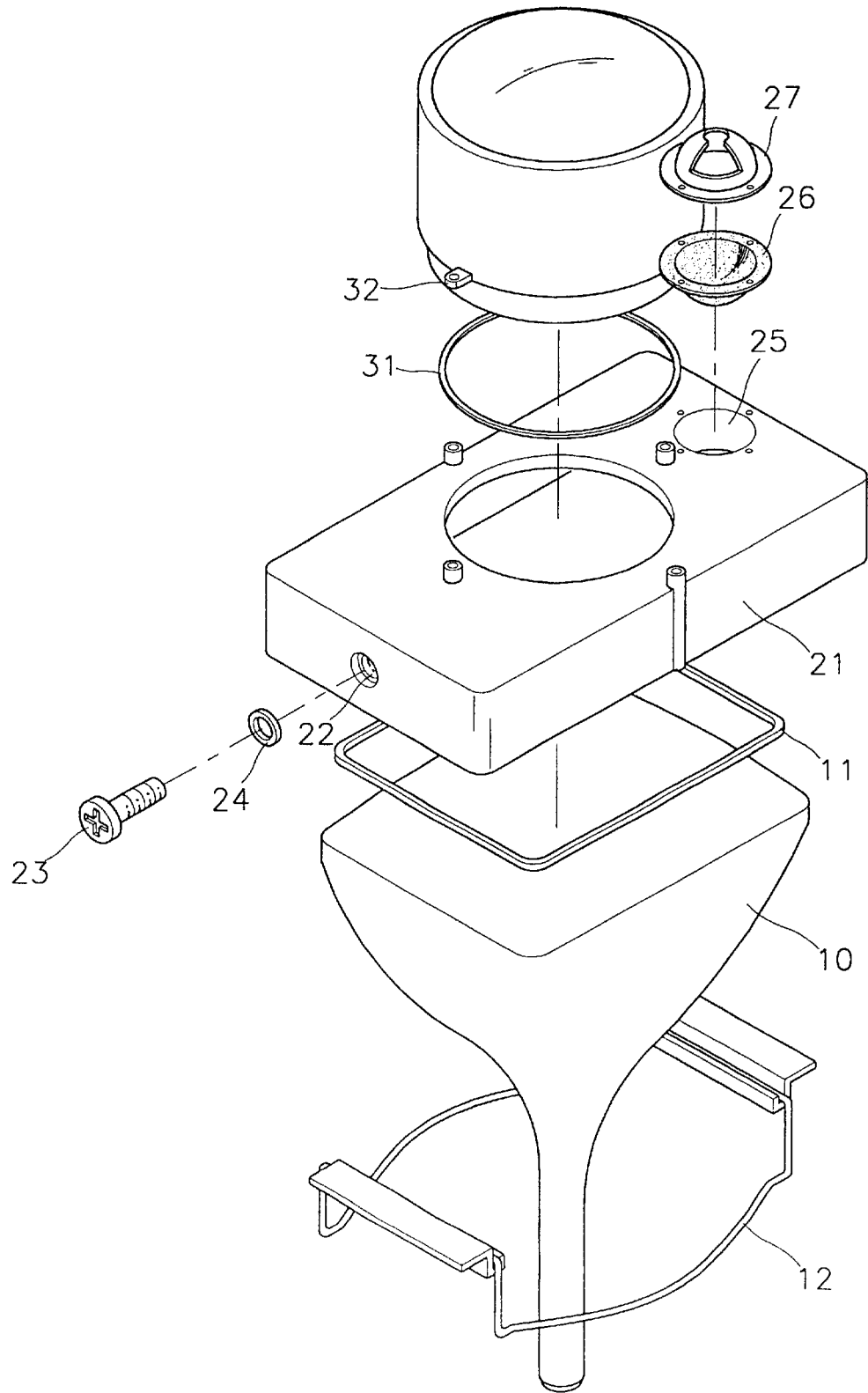
FIG. 3 is a perspective view of the coupler shown in FIG. 2.
Figure 4:
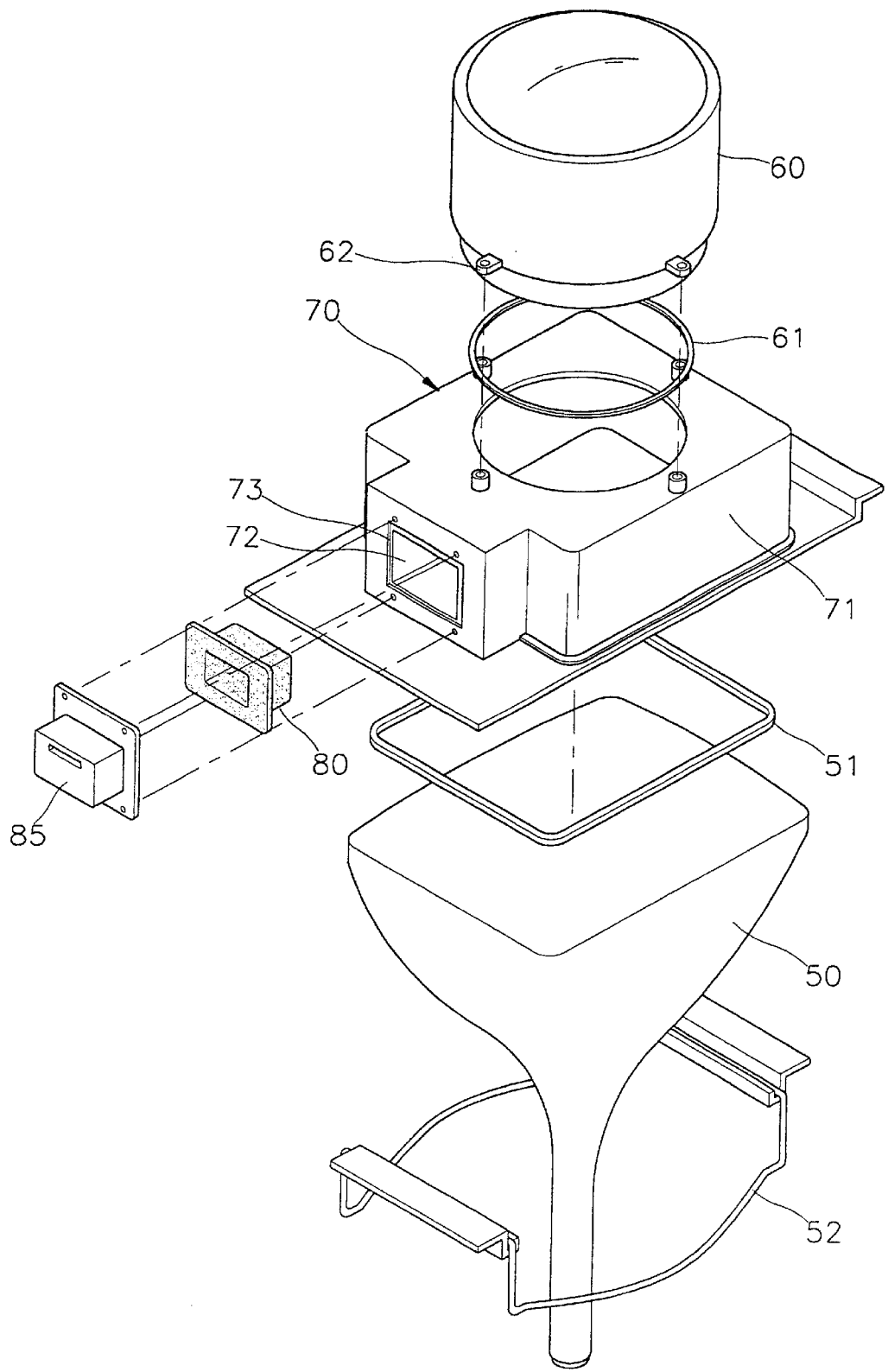
FIG. 4 is a perspective view showing a CRT assembly of a projection TV system according to a preferred embodiment of the present invention.
Figure 5:
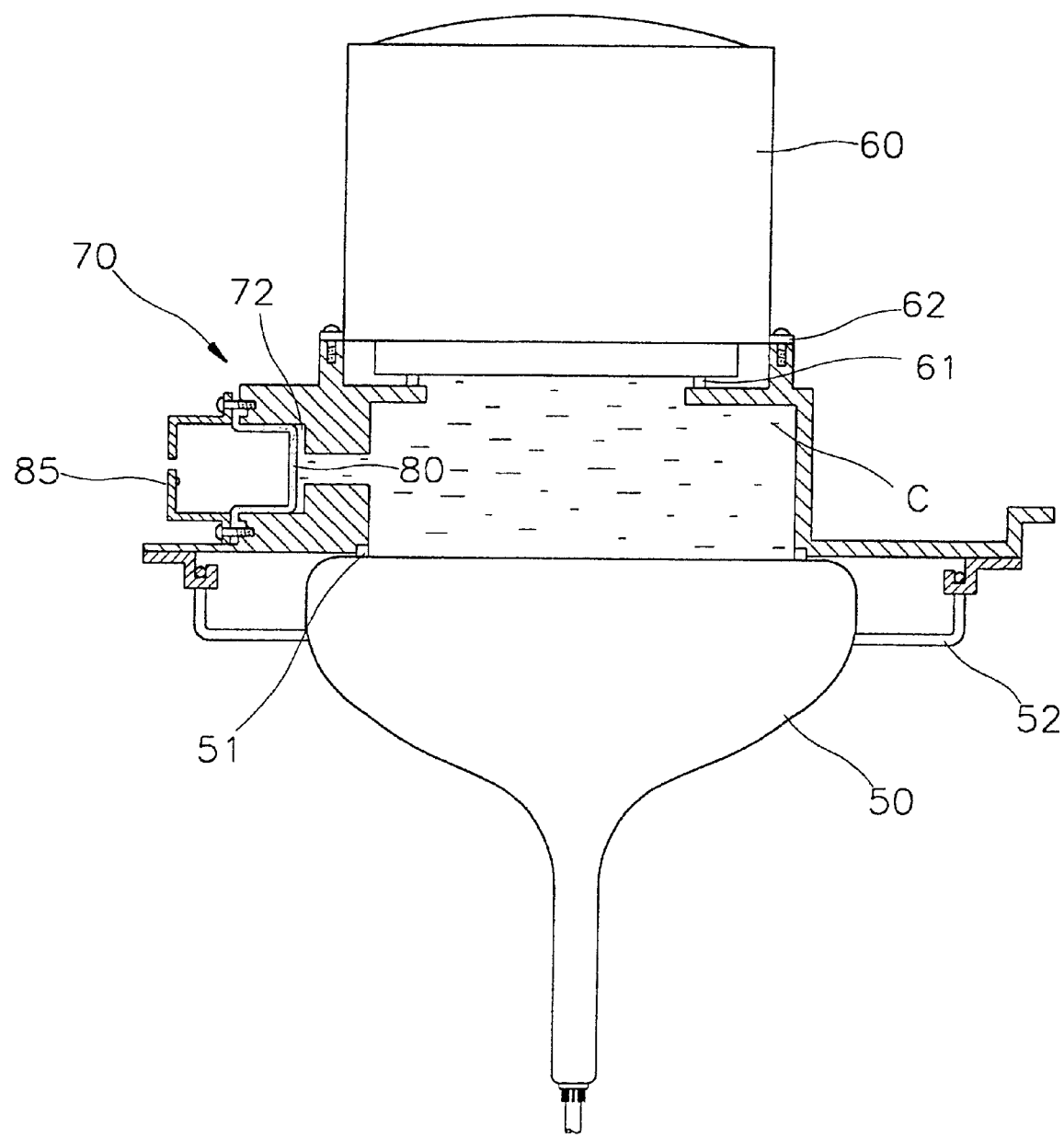
FIG. 5 is a sectional view of the CRT assembly shown in FIG. 5.

Referring to FIGS. 4 and 5, a CRT assembly of a projection TV system according to a preferred embodiment of the present invention includes a CRT 50 for forming an image, a projection lens 60 for magnifying the image formed by the CRT 50 and projecting the magnified image to a screen 3 (see FIG. 1), and a coupler 70 for coupling the CRT 50 and the projection lens 60. The CRT 50 and the projection lens 60 each are closely coupled to the coupler 70 by sealing members 51 and 61 and the fixing brackets 52 and 62. The coupler 70 includes a coolant receiving portion 71, a coolant injection hole 72 and a coolant pressure control device for cooling the heat generated from the front surface of the CRT 50.

The coolant receiving portion 71 is formed at the center of the coupler 70 and both sides of the coolant receiving portion 71 are open. When the coupler 70 is coupled to the CRT 50 and the projection lens 60, the front side of the coupler 70 contacts the projection lens 60, forming a seal, and the rear side thereof contacts the CRT 50, forming a seal. Coolant C is filled in a space formed in the coolant receiving portion 71 by being sealed by the CRT 50 and the projection lens 60.

The coolant injection hole 72 is formed at the side of the coupler 70 to be connected to the outside of the coolant receiving portion 71 to fill coolant C in the coolant receiving portion 71. A sealing groove 73 (refer to FIG. 6) is formed in the coupler 70 to be indented around the coolant injection hole 72. The pressure control device is for controlling the pressure of the coolant C filled in the coolant receiving portion 71 and include an oil cap 80 and the oil cap holder 85 installed at the coolant injection hole 72.

Figure 6:
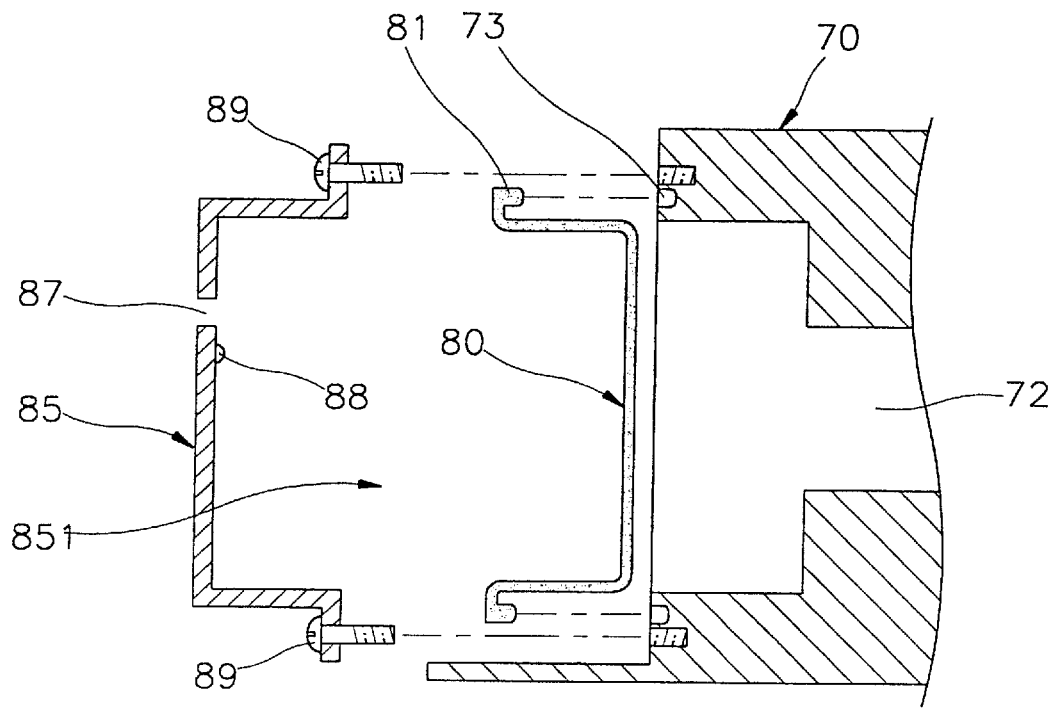
FIG. 6 is a magnified sectional view of the pressure control device shown in FIG. 5.
Figure 7:
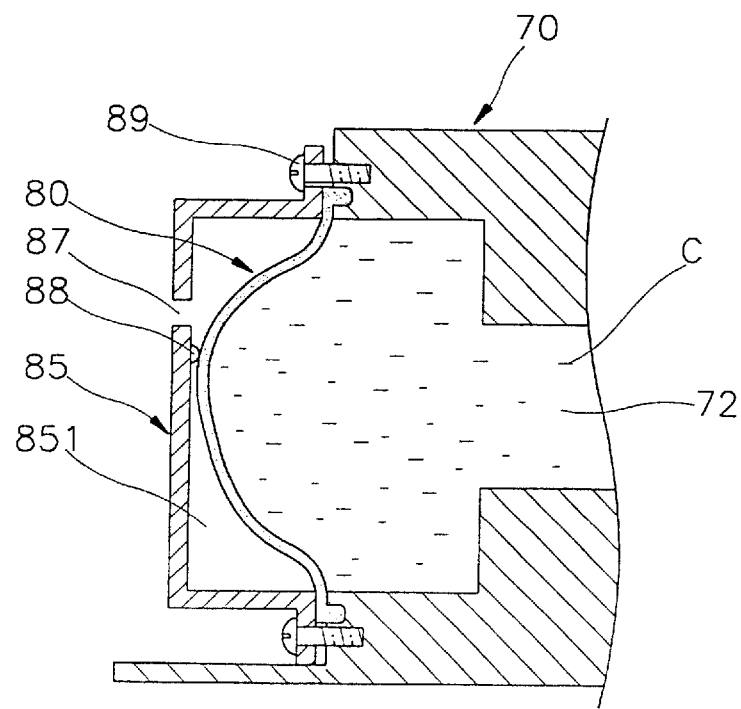
FIG. 7 is a sectional view for explaining the operation of the pressure control device shown in FIG. 5.

Referring to FIGS. 6 and 7, the oil cap 80 has a convex shape in one direction and is inserted into the coolant injection hole 72. The convex shape of the oil cap 80 can be deformed into a concave shape when coolant C expands according to changes in pressure of the coolant receiving portion 71. A sealing portion 81 to be inserted into the sealing groove 73 formed along the outer circumference of the coolant injection hole 72 is formed at the edge of the oil cap 80. The oil cap 80 is preferably formed of rubber capable of being elastically deformable to be able to handle expansions and compressions of coolant C.

The oil cap holder 85 coupled to the coupler 70 by screws 89 provides a compressing force in a state in which the sealing portion 81 of the oil cap is inserted into the sealing groove 73, so that the oil cap 80 and the coolant injection hole 72 can continue to form a seal. The oil cap holder 85 is formed to be convex in a direction in which the oil cap 80 bulges, as shown in FIG. 6, to provide a space 851 between the oil cap 80 and the oil cap holder 85. An air hole 87 is formed at the oil cap holder 85, as shown in FIG. 7, through which air in the space 851 can pass out of the oil holder 85 when the oil cap 80 expands or is compressed. Also, a protrusion 88 is formed on the inner surface of the oil cap holder 85 near the air hole 87 to prevent the air hole 87 from being clogged as the oil cap 80 contacts the oil cap holder 85 when the oil cap 80 expands.

As described above, in the CRT assembly of a projection TV system according to the present invention, as the oil cap 80 and the oil cap holder 85 for controlling the pressure of the coolant C is installed at the coolant injection hole 72 of the coupler 70, the number of parts can be reduced, compared to the conventional CRT assembly needing separate parts for injecting coolant and for controlling the pressure of the coolant. Thus, as the number of parts and manufacturing steps decreases, the cost for manufacturing products can be reduced.

Also, the CRT assembly according to the present invention is installed to be slanted when it is installed at the projection TV system. Here, by installing the oil cap 80 and the oil cap holder 85 for controlling the pressure of coolant C filled in the coolant receiving portion 71 at the upper side of the coupler 70 which is slanted, coolant C is prevented from being leaked between the oil cap 80 and the coupler 70 when the pressure of coolant C in the coolant receiving portion 71 increases and coolant C expands as the temperature of the CRT increases.

What is claimed is:

1. A CRT assembly of a projection TV system, comprising:

a CRT for forming an image;

a projection lens for magnifying and projecting the image formed by the CRT;

a coupler installed between the CRT and the projection lens;

a coolant receiving portion formed at the center of the coupler, having a front surface in contact with the projection lens forming a seal and a rear surface in contact with a front surface of the CRT forming a seal;

a coolant injection hole formed to penetrate a side of the coolant receiving portion, through which coolant is filled in the coolant receiving portion;

an oil cap to be inserted into the inside the coolant injection hole and capable of being deformed when the coolant expands and is compressed according to the change of pressure of the coolant in the coolant receiving portion; and an oil cap holder fixing the oil cap to the coolant receiving portion, said oil cap and said oil cap holder are positioned in spaced relationship to each other, an aperture being formed in said oil cap holder allowing air between said oil cap and said oil cap holder to escape when said oil cap expands towards said oil cap holder.

2. The CRT assembly as claimed in claim 1, wherein a protrusion is formed on an inner surface of the oil cap holder to prevent an aperture from being clogged by the oil cap when the oil cap expands and contacts the oil cap holder.

3. The CRT assembly of claim 1, wherein when said oil cap bulges outward and becomes convex, said oil cap essentially fills a concave portion of said oil cap holder.

4. A CRT assembly of a projection TV system, comprising:

a CRT for forming an image;

a projection lens for magnifying and projecting the image formed by the CRT;

a coupler installed between the CRT and the projection lens;

a coolant receiving portion formed at the center of the coupler, having a front surface in contact with the projection lens forming a seal and a rear surface in contact with a front surface of the CRT forming a seal;

an oil cap inserted into the inside the coolant injection hole and capable of being deformed from a concave shape to a convex shape and vise versa when the coolant expands and is compressed according to the change of pressure of the coolant in the coolant receiving portion;

an oil cap holder fixing the oil cap to the coolant receiving portion, an aperture being formed in said oil cap holder allowing air between said oil cap and said oil cap holder to escape when said oil cap expends towards said oil cap holder; and a coolant injection hole formed within said oil cap and said oil cap holder, said coolant injection hole penetrates a side of the coolant receiving portion, coolant is filled through said coolant injection hole of the coolant receiving portion and coolant interacts with said oil cap and said oil cap holder through said coolant injection hole when said CRT assembly is in use.

5. The CRT assembly as claimed in claim 4, wherein said oil cap and said oil cap holder are positioned in spaced relationship to each other.

6. The CRT assembly as claimed in claim 4, wherein a protrusion is formed on an inner surface of the oil cap holder to prevent said aperture from being clogged by the oil cap when the oil cap expands and contacts the oil cap holder.

7. The CRT assembly of claim 4, wherein when said oil cap bulges outward and becomes convex, said oil cap essentially fills a concave portion of said oil cap holder.

8. A method of operating a coolant system for a CRT assembly of a projection TV, comprising the steps of:

removing an oil cap holder from said coolant system;

removing an oil cap from said coolant system;

filling said coolant system with coolant through a coolant injection hole disposed beneath said oil cap holder and said oil cap;

fixing said oil cap over said coolant injection hole;

fixing said oil cap holder over said oil cap; and turning on power to said CRT assembly causing said coolant to heat up causing said oil cap to fluctuate from a concave shape to a convex shape bulging towards said oil cap holder, said fluctuation of said oil cap causes air to either escape from or get sucked into said oil cap holder through a slit on said oil cap holder.

9. The method of claim 8, a protrusion being formed on a concave surface of said oil cap holder preventing said slit from being blocked by said oil cap when said oil cap bulges outward and is convex and essentially fills said concave portion of said oil cap holder.

10. The method of claim 9, further comprising the step of turning off power to said CRT assembly causing said coolant to cool down causing said oil cap to recede away from said oil cap holder and become concave.

* * * * *